United States Patent [19]

Tomura et al.

[11] Patent Number: 5,162,719
[45] Date of Patent: Nov. 10, 1992

[54] BATTERY PACK CHARGER

[75] Inventors: Masashi Tomura; Hisamitsu Takagi; Yoshihiro Matsumoto, all of Kawasaki, Japan

[73] Assignee: Fujitsu Limited, Japan

[21] Appl. No.: 764,723

[22] Filed: Sep. 24, 1991

[30] Foreign Application Priority Data

May 22, 1991 [JP] Japan .................. 3-117392

[51] Int. Cl.$^5$ ........................... H01M 10/44
[52] U.S. Cl. ........................... 320/2; 320/15
[58] Field of Search .............. 320/2, 20, 21, 15

[56] References Cited

U.S. PATENT DOCUMENTS

| | | | |
|---|---|---|---|
| 4,091,318 | 5/1978 | Eichler et al. | 320/2 |
| 4,963,812 | 10/1990 | Mischenko et al. | 320/2 |
| 5,059,885 | 10/1991 | Weiss et al. | 320/2 |
| 5,065,082 | 11/1991 | Fushiya | 320/2 |

Primary Examiner—Steven L. Stephan
Assistant Examiner—Matthew Nguyen
Attorney, Agent, or Firm—Staas & Halsey

[57] ABSTRACT

A battery pack charger capable of charging plural types of battery packs of different sizes. In a casing in which the battery packs are slid for mounting, there are housed a printed-circuit board and a fixing member removably fixed on the printed-circuit board for retaining the forward end section of the battery pack cooperatively with the casing. Further, in the casing are also installed current supply terminals for supplying the charging current to the battery pack. Further, in the casing are integrally formed a pair of guides for guiding the right and left sides of the battery pack and a head for holding from above the forward end section of the battery pack. The battery pack, when mounted, is secured only at the forward end section, and is exposed outside in a large portion, and therefore it is possible to charge plural types of battery packs of different sizes.

3 Claims, 13 Drawing Sheets 15,162,719

BATTERY PACK CHARGER

BACKGROUND OF THE INVENTION

1. Field of the Invention

The present invention relates generally to a battery pack charger for charging a battery pack containing a plurality of batteries and, more particularly, to a battery pack charger suitable for charging a battery pack for portable telephones or the like.

2. Description of the Related Art

The ultimate object of communication, needless to mention, resides in enabling immediate transmission or exchange of a telephone-user's will or information at any time, from any place, and to any person called up. Mobile communication is now therefore gradually increasing in addition to conventional communication between stationary communication points. Mobile communication is communication between telephones on moving bodies such as ships, automobiles, aircraft, etc. and stationary telephones such as a general subscriber's telephone and an office telephone, and between telephones on moving bodies such as a car telephone, a portable telephone, a cordless telephone, etc.

With the development of smaller-size and higher-performance mobile communication terminals such as portable telephones and the like, higher-density mounting has come to be adopted for these terminals and, accordingly, the use of smaller battery packs in the terminals is popular. The battery, therefore, becoming smaller in capacity, requires frequent recharging. A battery charger in general use is designed to be able to charge a battery pack as installed in a portable telephone.

The conventional battery chargers, however, have such a problem that a portable telephone, when charged, is set to the charger with the battery pack as installed in the telephone. In this case, a large type battery charger is required, which is inconvenient for carrying.

SUMMARY OF THE INVENTION

The present invention has been accomplished in an attempt to solve the problems described above, and therefore it is an object of the present invention to provide a small battery pack charger convenient for carrying.

In accordance with an aspect of the present invention, there is provided a battery pack charger for charging a battery pack containing a plurality of batteries, which has a pair of charging terminals on the bottom surface thereof. The battery pack charger comprises a casing into which the battery pack is slid for mounting, the casing having a pair of guides for guiding both sides of the battery pack being inserted, a mounting surface for mounting the battery pack, and a head for holding from above the forward end section of the battery pack inserted; a printed-circuit board housed in the casing and on which a charging circuit is formed; a fixing member removably secured on the printed-circuit board and fixing the forward end section of the battery pack in cooperation with the casing head; and a pair of terminals for current supply electrically connected to the charging circuit of the printed-circuit board, the terminals for current supply being adapted to contact the terminals for charging the battery pack to supply the charging current from the charging circuit to the battery pack.

Each guide preferably has a recess in which a lug formed on both sides of the battery pack fits when the battery pack is inserted. When the battery pack is mounted on the charger, the forward end of the battery pack is fixedly held by the fixing member and the head of the casing, each lug fitting in the recess, thus fixing the rear end of the pack.

The above and other objects, features and advantages of the present invention and the manner of realizing them will become more apparent, and the invention itself will best be understood from a study of the following description and appended claims with reference to the attached drawings showing some preferred embodiments of the invention.

DESCRIPTION OF THE PREFERRED EMBODIMENTS

Figure 1:
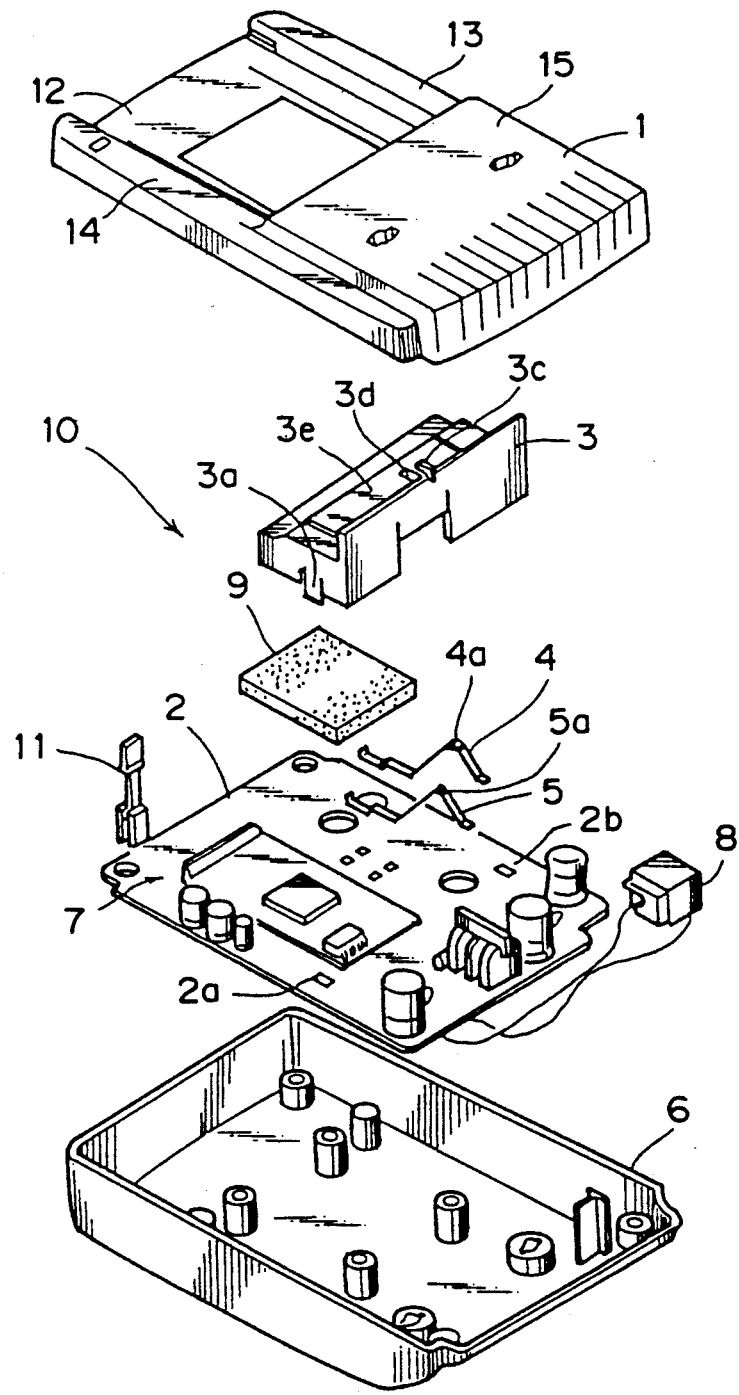
FIG. 1 is a exploded perspective view of a preferred embodiment of a battery pack charger according to the present invention.

FIG. 1 is an exploded perspective view of an embodiment of a battery pack charger according to the present invention. In this drawing, a rear casing 6 contains a printed-circuit board 2. On the printed-circuit board 2 is arranged a fast charging circuit 7 comprising ICs and capacitors, for voltage-conversion of the direct-current power supply voltage input from an AC adapter through a connector 8 for fast charging a battery pack. Furthermore on this printed-circuit board 2 are installed electric current supply terminals 4 and 5 for supplying the charging current from the fast charging circuit 7 to the changing terminals of the battery pack. The current supply terminals 4 and 5 are each soldered at one end to the printed-circuit board 2 and designed to contact at the other end the charging terminal of the battery pack. The other end of the current supply terminals 4 and 5 are so formed as to make point contact with the charging terminals of the battery pack. In this description the current supply terminal 4 is a positive terminal, while the current supply terminal 5 is a negative terminal.

The printed-circuit board 2 is fitted with the fixing member 3 through a cushion 9. On the fixing member 3 are formed lugs 3a and 3b (3b is not illustrated in FIG. 1 but is opposite lug 3a), which are inserted into holes 2a and 2b made in the printed-circuit board 2 when the fixing member 3 is installed. In the state that the fixing member 3 is installed on the printed-circuit board 2, a contact 4a of the current supply terminal 4 protrudes out of a surface 3e through its terminal hole 3c, and a contact 5a of the current supply terminal 5 protrudes out of the surface 3e through a terminal hole 3d. Furthermore the printed-circuit board 2 is fitted with an LED 11 for indicating a charged state.

A front casing 1 is fitted from above to the printed-circuit board 2 mounted with these parts. The front casing 1, the fixing member 3 and the rear casing 6 are each formed in one body of a synthetic resin such as a plastic material.

Figure 2:
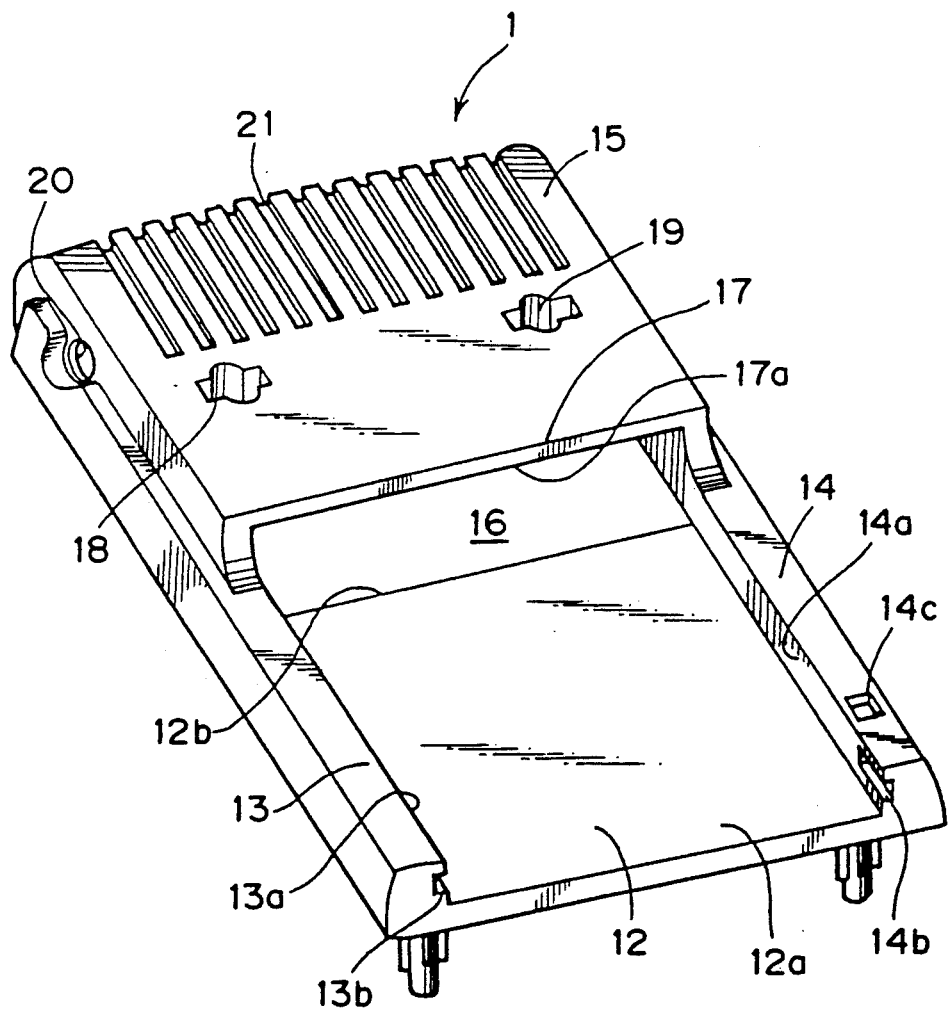
FIG. 2 is a perspective view of a front casing.

FIG. 2 is a perspective view showing the constitution or construction of the front casing 1. The front casing 1 consists of or includes a plate 12 for mounting mainly the battery pack described later, guide sections 13 and 14 for guiding the battery pack from the right and left sides, and a head 15 for fixing the forward end of the battery pack in cooperation with the fixing member 3.

The plate 12 extends nearly to the vicinity of the center of the whole body of the front casing 1, and is adapted to support the battery pack fully by its upper surface 12a. A distance between the inside surfaces 13a and 14a of the guide sections 13 and 14 is designed to be nearly the same as, or slightly larger than, the width of the battery pack, thereby allowing the insertion by sliding of the battery pack toward the head 15. The guide sections 13 and 14 are provided with grooves 13b and 14b. Further the guide section 14 has a hole 14c for mounting the light-emitting section of the LED 11. A space 16 defined by the guide sections 13 and 14 and the end section 12b of the plate 12 is designed so that the fixing member 3 will be positioned therein.

The head 15 has a roof 17 formed to cover the space 16 from above. The roof 17 is designed such that when the fixing member 3 is installed in the space 16, the distance between the inside surface 17 and the surface 3e of the fixing member 3 will be the same as, or slightly larger than, the thickness of the battery pack, thereby holding the forward end of the battery pack with the roof 17 and the fixing member 3.

The head 15 is provided with connecting holes 18 and 19 for connecting the charger described later with the battery pack charger 10 of the present embodiment, a plug hole 20 for inserting a plug of the AC adapter, and a radiator 21 for radiating heat from inside the battery pack charger 10.

Figure 3:
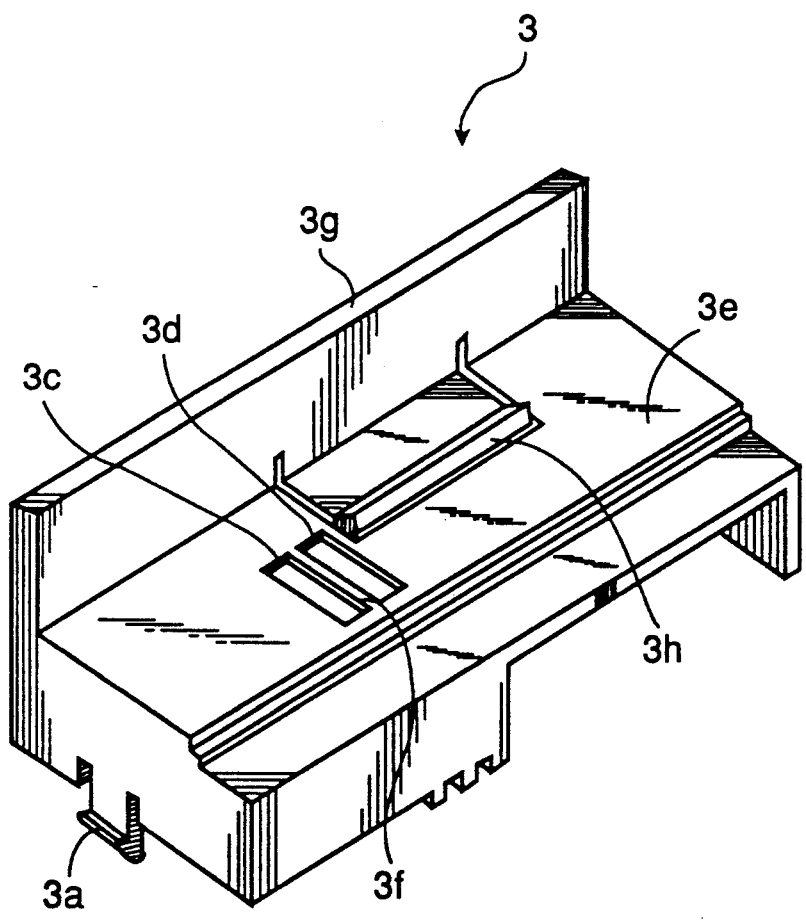
FIG. 3 is a perspective view of a fixing member.

FIG. 3 is a perspective view showing the constitution of the fixing member 3. The fixing member 3 has lugs 3a and 3b (3b is not illustrated in FIG. 3) for mounting the fixing member 3 to the printed-circuit board 2, and terminal holes 3c and 3d for positioning the contacts 4a and 5a of the terminals 4 and 5 at the time of this mounting. Between the terminal holes 3c and 3d is formed a flat-plate partition 3f which prevents contact between the contact points 4a and 5a. The fixing member 3 has a partition wall 3g, which is formed to separate the interior of the battery pack charger 10 from the outside. On the fixing member 3 there is formed a pawl 3h for fixing the battery pack in position. A U-shaped slit is formed along the front end of this pawl 3h and extending on both sides thereof, allowing vertical elastic deflection of the pawl 3h.

Figure 4:
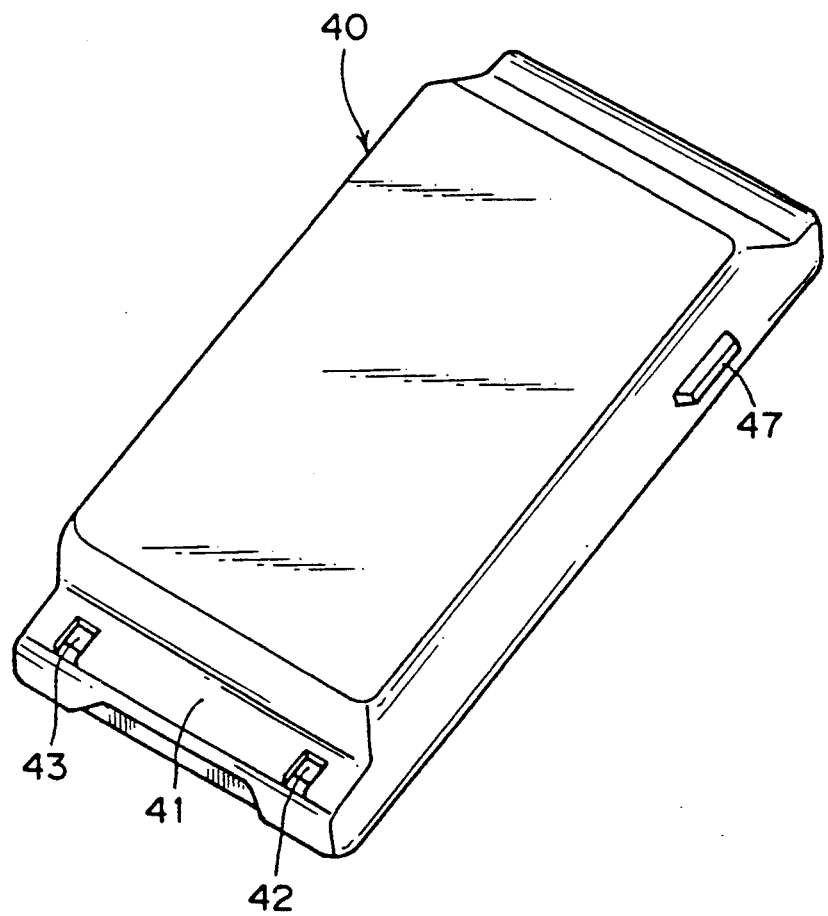
FIG. 4 is a perspective view of a battery pack.

Next, the constitution of the battery pack to be mounted on the battery pack charger 10 will be explained. FIG. 4 is a perspective view of the battery pack 40. The battery pack 40 contains batteries not illustrated. Usually, the battery pack 40 comes in two types a large-capacity type (e.g. 700 mAh) and a small-capacity type (e.g. 400 mAh). In the present embodiment, the large-capacity battery pack will be explained. The large-capacity battery pack 40 is naturally larger in size than the small-capacity type. The battery pack 40 shown in FIG. 4 is almost the same in both the longitudinal and lateral sizes as the small-capacity type; the only difference being thickness except that of the forward end section 41. When the charger describe later is used for charging the battery pack 40 as installed on a portable telephone 56 which will be described later, the charging current to be supplied through the terminals 42 and 43 located at the forward end section 41 is supplied to batteries in the battery pack 40.

Figure 5:
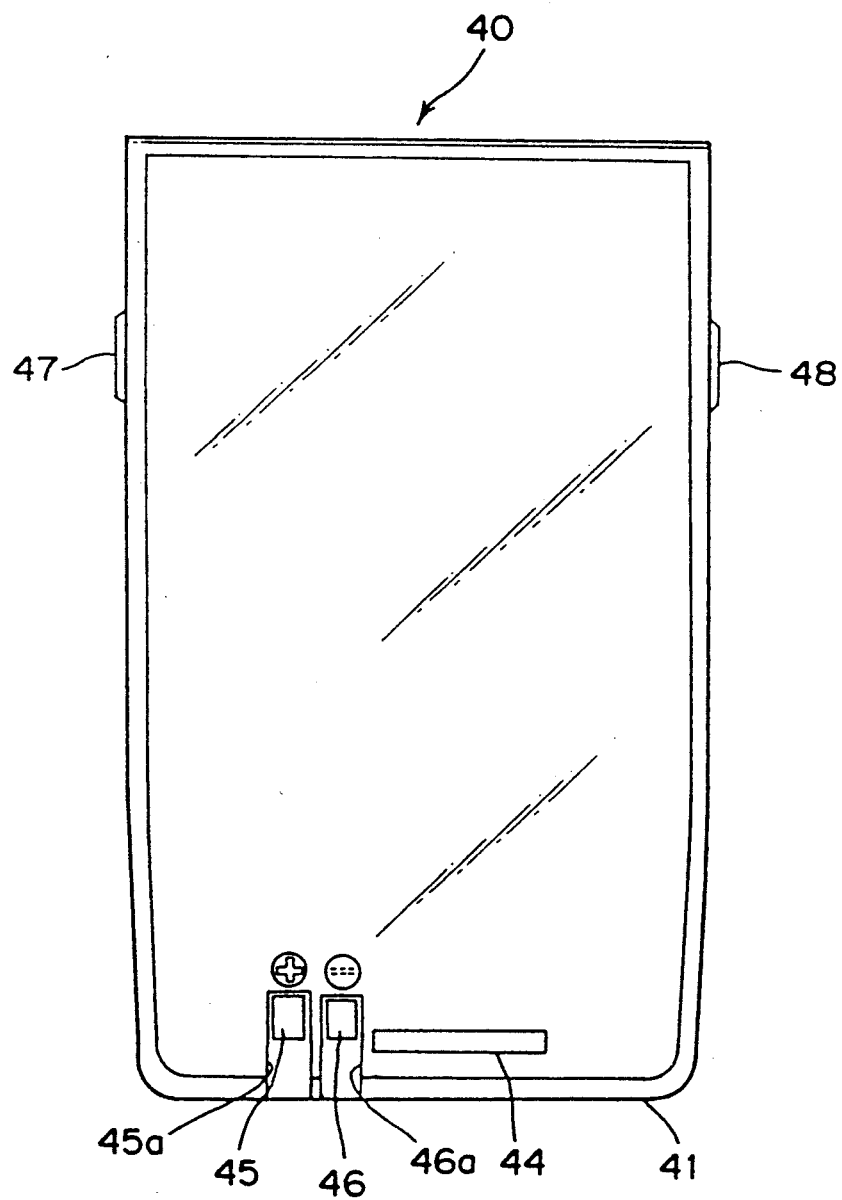
FIG. 5 is a bottom view of the battery pack.

FIG. 5 is a bottom view of the battery pack 40. On the back side of the forward end section 41 is formed an elongated recess 44. This recess 44 is so formed that the pawl 3h of the fixing member 3 fits therein. The positive terminal 45 and the negative terminal 46 are provided so as to contact the contact points 4a and 5a of the terminals 4 and 5 respectively. These terminals 45 and 46 are located in the grooves 45a and 46a which are formed shallow. The grooves 45a and 46a extend as far as the end of the battery pack 40, the surface of which is so formed as to be flush with the surface of the terminals 45 and 46.

Therefore, when the battery pack 40 is mounted in communication terminal equipment, the contact points 4a and 5a of the terminal 4 and 5 will come into smooth contact with the terminals 45 and 46 respectively without hitching the end of the battery pack 40. With the battery pack 40 mounted in the communication terminal equipment, the power supply current from the battery is supplied to the terminal equipment through the terminals 45 and 46. Furthermore the battery pack 40 has lugs 47 and 48 formed on its both rear sides. These lugs 47 and 48 are so provided as to fit in the grooves 13b and 14b formed in the guide sections 13 and 14 of the upper case 1.

Figure 6:
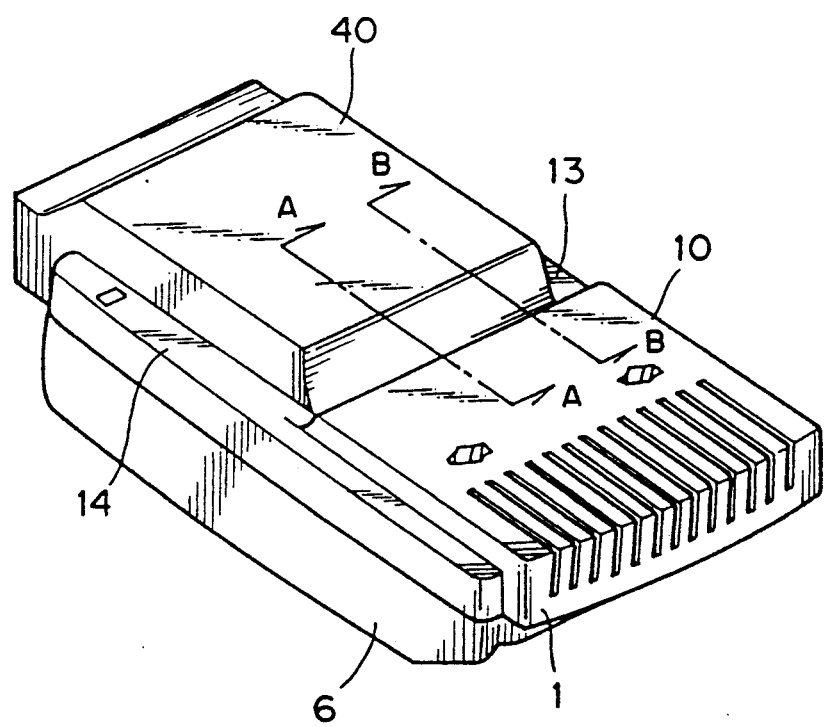
FIG. 6 is a perspective view showing the battery pack mounted on the battery pack charger.

FIG. 6 is a perspective view showing the battery pack 40 mounted on the battery pack charger 10. The battery pack 40 is slid along the guide sections 13 and 14 into the battery pack charger 10. At this time the lugs 47 and 48 of the battery pack 40 come into engagement with the grooves 13b and 14b respectively, thereby maintaining stability by eliminating looseness after mounting. As the lugs 47 and 48 serve also as stoppers, it is possible to prevent excessive insertion of the battery pack 40. The forward end section of the battery pack is secured by the fixing member 3 and the head 15 and the lugs 47 and 48 fitted in the grooves 13b and 14b respectively, thus holding the battery pack 40 stable against vibrations and shocks from a moving body.

Figure 7:
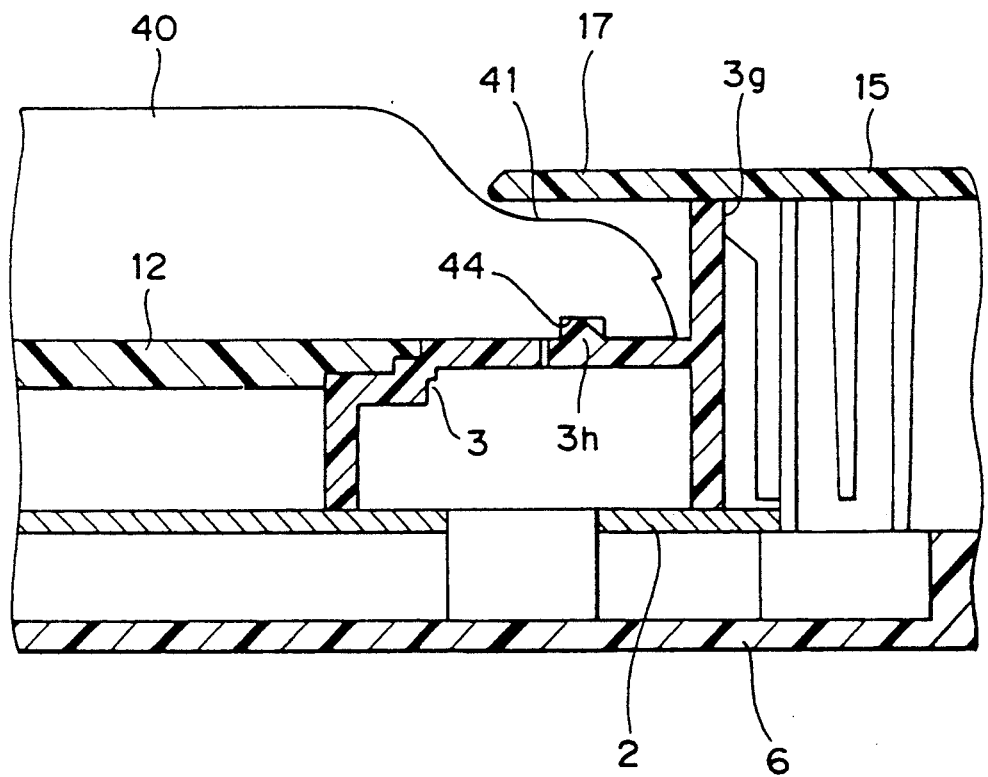
FIG. 7 is a sectional view taken along line A—A of FIG. 6.
Figure 8:
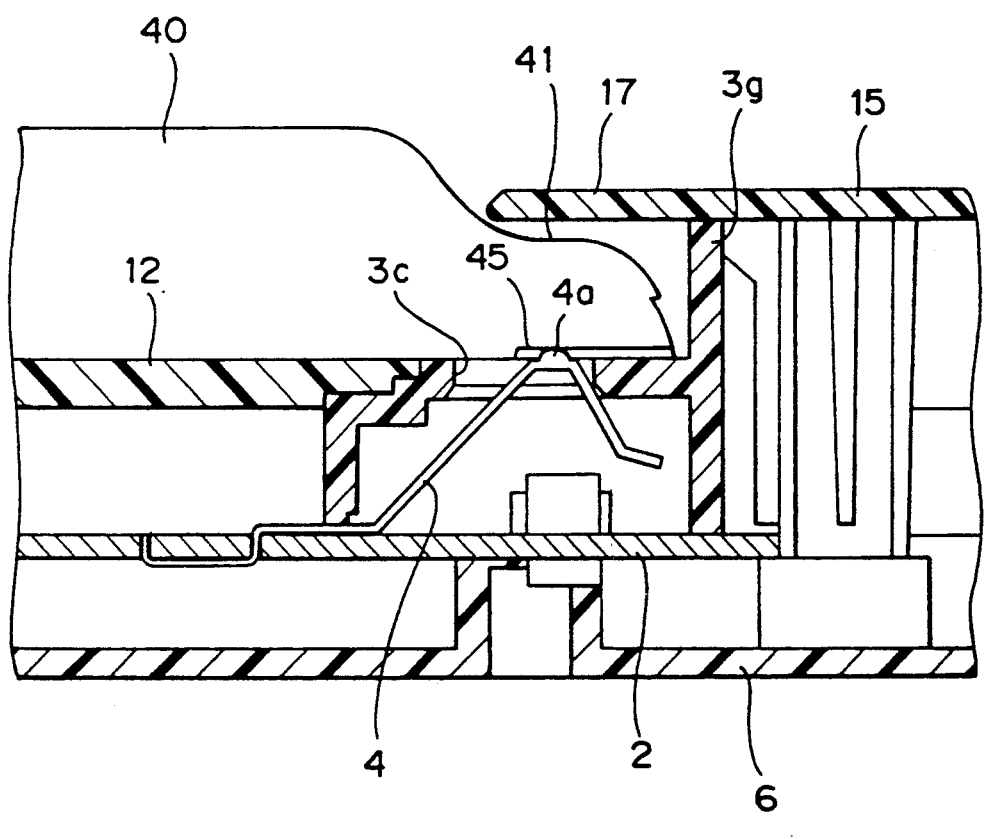
FIG. 8 is a sectional view taken along line B—B of FIG. 6.

FIG. 7 is a sectional view taken along line A—A in FIG. 6. When the battery pack 40 is mounted, the pawl 3h of the fixing member 3 is fitted in the recess 44, thereby fixing the battery pack 40 such that the battery pack 40 will not easily slip out of its position. FIG. 8 is a sectional view taken along line B—B in FIG. 6. The contact point 4a of the terminal 4 is pressed downward by the bottom surface of the battery pack 40 to contact with the positive terminal 45. The contact point 5a of the terminal 5 and the negative terminal 46 are in a similar relation and not illustrated.

Since only the battery pack 40 removed from the terminal equipment is mounted to the battery pack charger 10 as described above, the charger 10 can be made compact in size. In the state that the battery pack 40 is mounted, most of the top surface except the forward end section 41 of the battery pack 40 will not be fixed. Therefore, battery packs, different in charging capacity, are usable as long as they have the same specified length and width.

Figure 9:
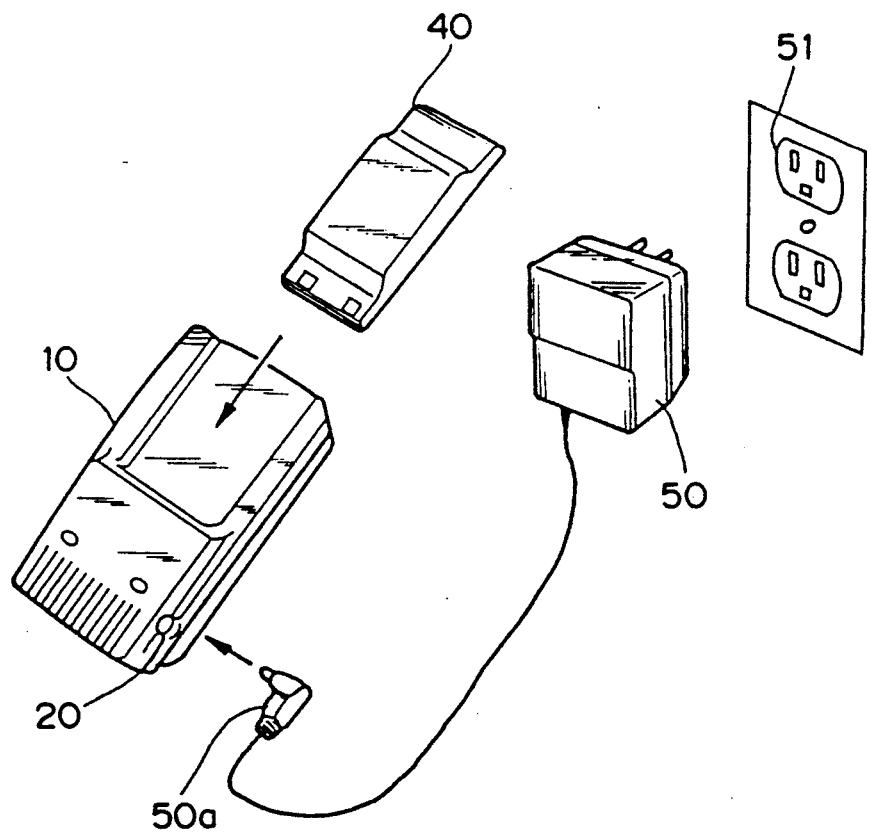
FIG. 9 is a view explaining the basic usage of the battery pack charger.

Next, the usage of the battery pack charger 10 will be explained. In this example, the battery pack charger 10 will be used for charging a battery pack used in a portable telephone. FIG. 9 is a view showing a basic method of use of the battery pack charger 10 according to the present invention. When charging is to be done indoors, the battery pack 40 is mounted to the battery pack charger 10, an AC adapter 50 is connected to a receptacle 51, and a connector 50a of the AC adapter 50 is inserted into a hole 20. After thus completing this setting, charging is finished in a short time (about 30 minutes to one hour). When the battery pack charger 10 is used in a car, a cigarette lighter cord is connected to supply the power supply current from the cigarette lighter socket.

Figure 10:
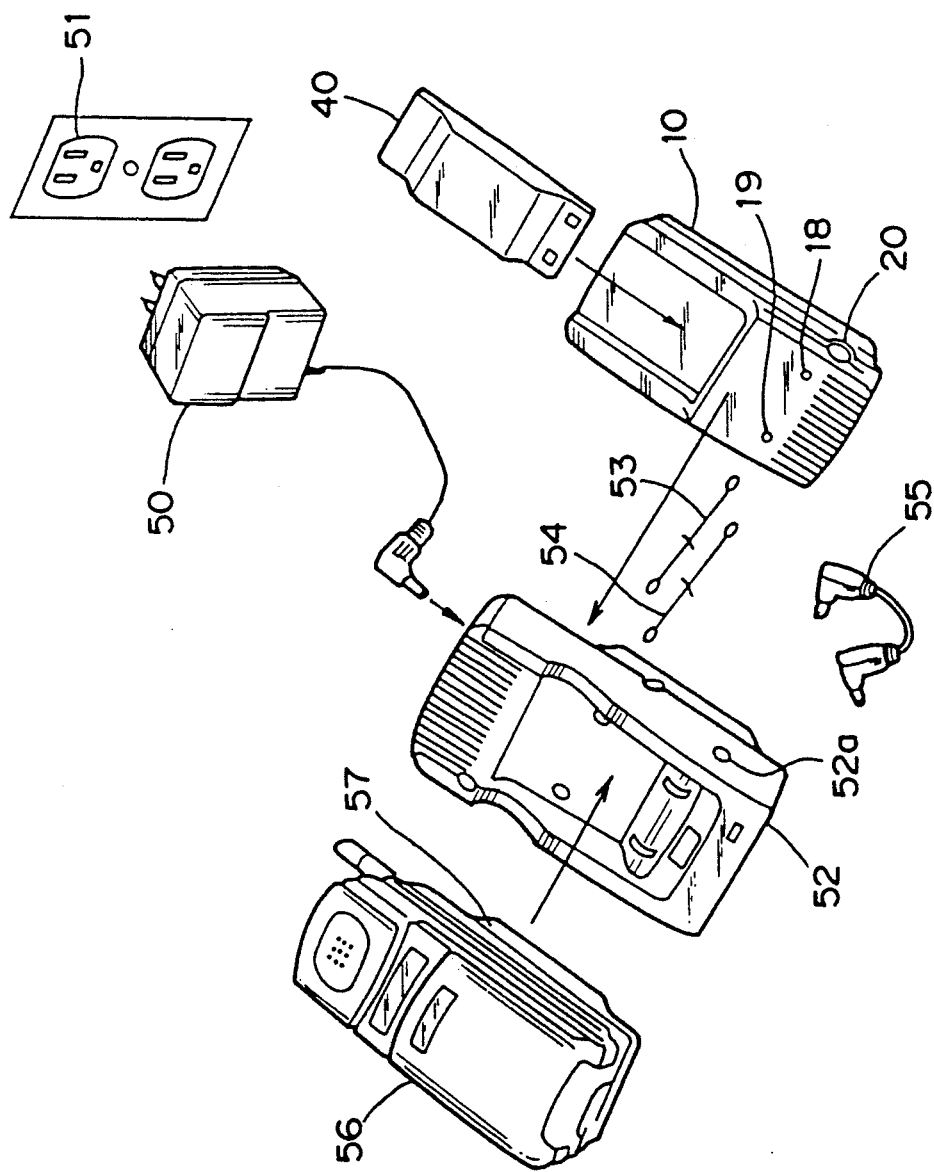
FIG. 10 is a view explaining a method of connecting, on the table, a portable telephone and another battery charger to a battery pack charger.

FIG. 10 is a view showing a method of connecting a portable telephone and a conventional battery charger to the battery pack charger 10 of the present invention in indoors. First, a charger 52 is connected from above to the battery pack charger 10 mechanically by use of connecting rods 53 and 54. That is, one end of the connecting rod 53 is inserted into a connecting hole 18 and one end of the connecting rod 54 into a connecting hole 19. On the other hand, the other end of each of the connecting rods 53 and 54 is inserted into the connecting hole not illustrated of the charger 52. Furthermore, the plug hole 20 of the battery pack charger 10 and the plug hole 52a of the charger 52 are electrically connected by use of a connecting cord 55.

The charger 52 is supplied with the electric current from the receptacle 51 through an AC adapter 50. This electric current is supplied also to the battery pack charger 10 through the connecting cord 55.

Figure 11:
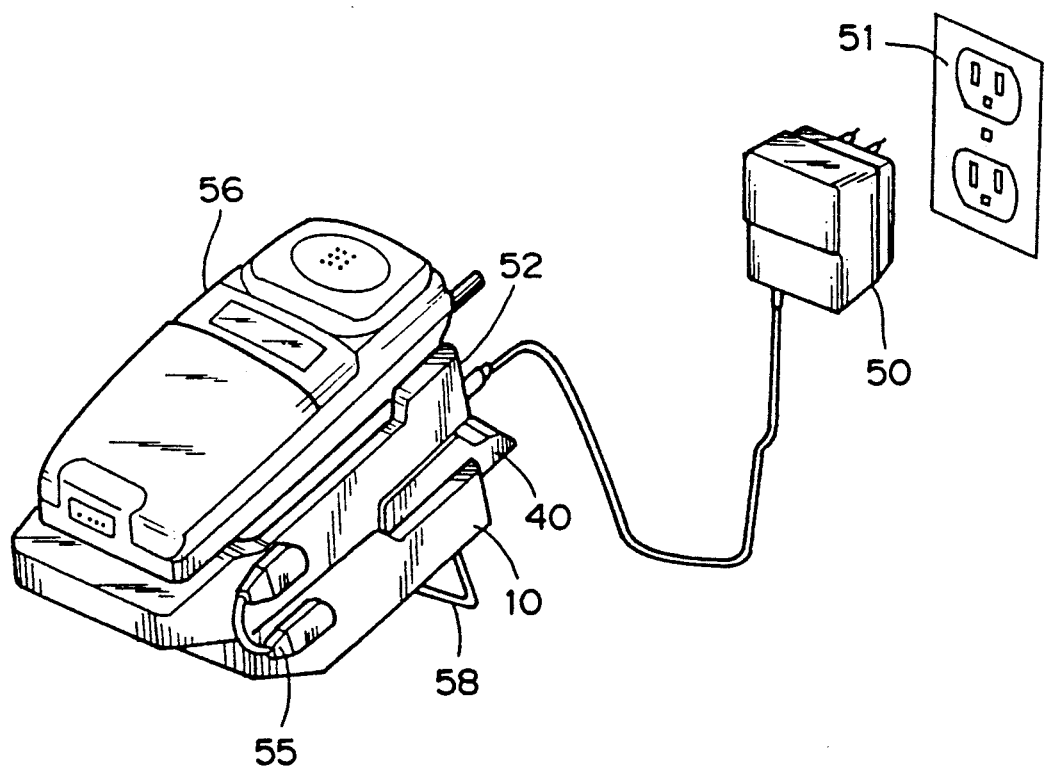
FIG. 11 is a perspective view showing another battery charger mounted on a portable telephone set, on the table, to the battery pack charger.

In the meantime, the portable telephone 56, as mounted with the battery pack 57, is installed to the charger 52. At this time, the battery pack 57 is charged directly by use of the charger 52, thereby permitting the constant charge of the battery pack 57 by the use of the charger 52 as in a conventional manner and, on the other hand, the fast charge of the battery pack 40 as a spare by using the battery pack charger 10. FIG. 11 shows the set state of these equipment. The battery pack charger 10 is fitted with a stand 58 in order to allow convenient handling of the telephone 56 on the desk. The stand 58 is fitted with a non-slip rubber.

Figure 12:
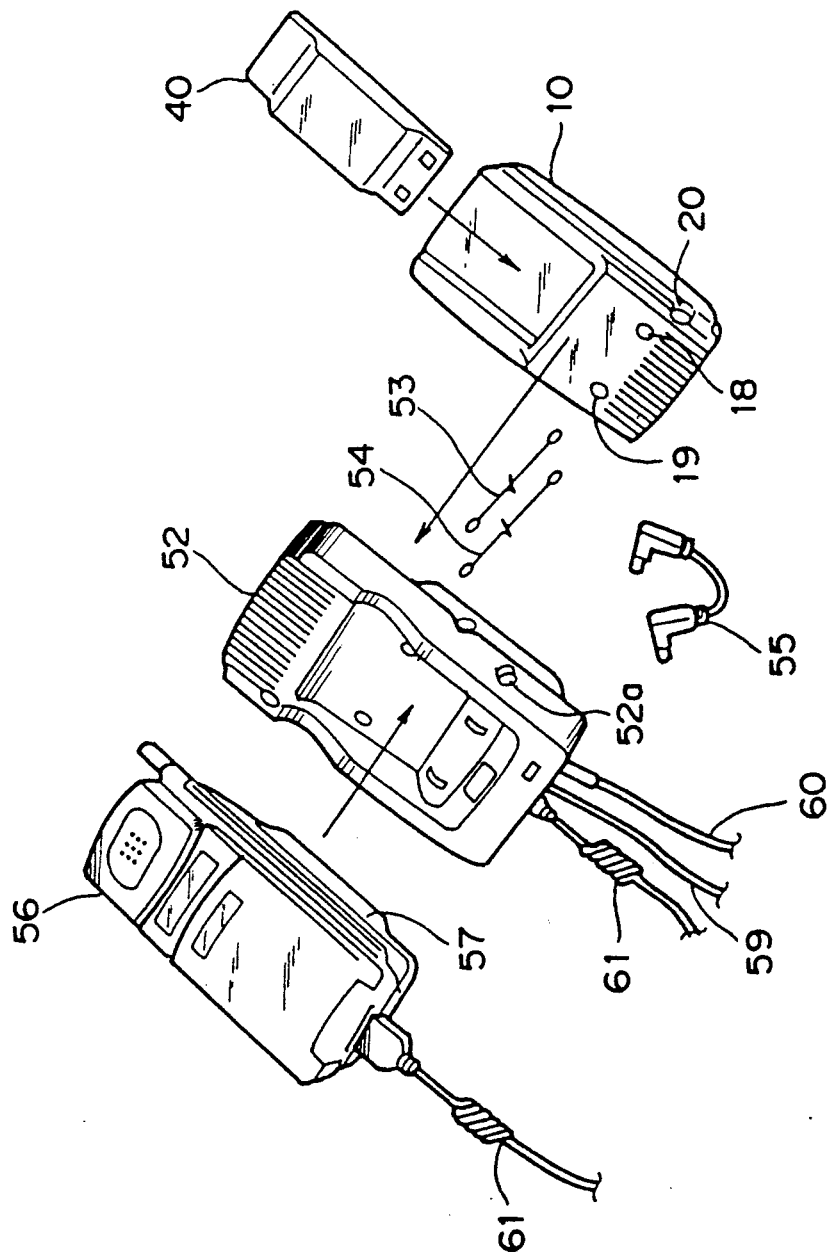
FIG. 12 is a view explaining a method of connecting, in the car, a portable telephone and a car-mounted adapter to the battery pack charger.

FIG. 12 is a view showing a method of connecting, within the car, a car-mounted adapter and a portable telephone to the battery pack charger 10. The connection of a car-mounted adapter including the charger circuit for use in the car, to the battery pack charger 10 can be done by the same procedure as that explained in FIG. 10. To the car-mounted adapter 52 are connected an antenna wire 59 and a power cord 60. The power cord 60 is, for example, a cigarette lighter cord, through which the current is supplied from a cigarette lighter socket not illustrated to the car-mounted adapter 52. The portable telephone 56 and the car-mounted adapter 52 are connected by an interface cord 61.

Figure 13:
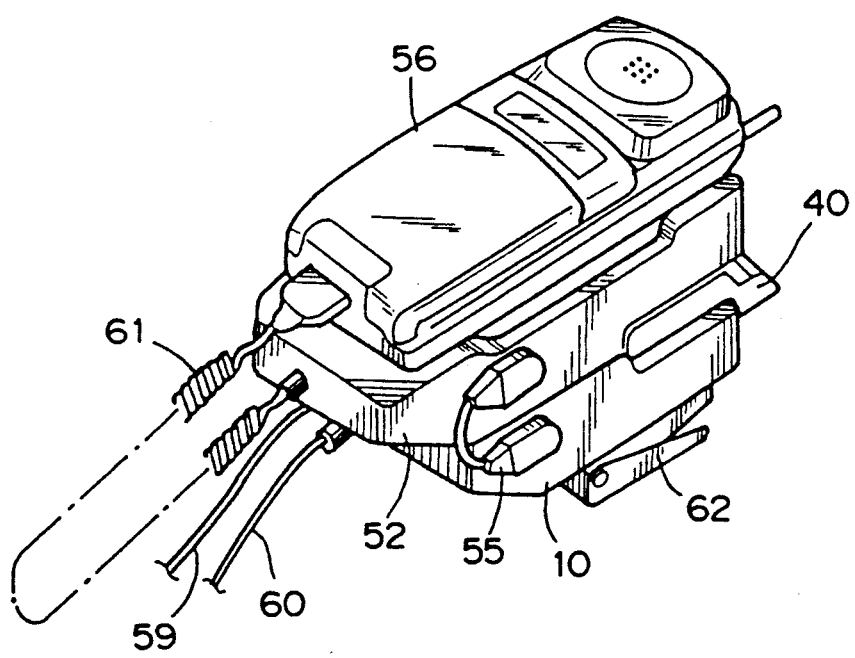
FIG. 13 is a perspective view showing a portable telephone and a car-mounted adapter set, in the car, mounted to the battery pack charger.

FIG. 13 is a view showing the set state of this equipment. The battery pack charger 10 is installed by a clamshell 62 in an optional place in the car, so that it will be possible to use the portable telephone 56 with ease in the car as well as to charge the battery pack 40 provided as a spare part or battery.

The portable telephone 56, at this time, can use the battery on the car through the interface cord 61. When mounted to the car-mounted adapter 52, the battery pack 40 will be charged.

According to the present invention, as described above, since the forward end section of the battery pack mounted in the casing is retained by the casing and the fixing member and the electric current is supplied to the charging terminals of the battery pack from the charging circuit on the printed-circuit board through the current supply terminals, only the battery pack is set to the charger when charged. It is, therefore, possible to make the battery pack charger smaller in size for the carrying convenience.

Also, since the casing is designed to guide the battery pack on both the right and left sides by means of the guide sections and to retain the forward end section of the battery pack by the head cooperatively with the fixing member, most of the upper surface of the battery pack will not be restrained. Accordingly it is possible to charge battery packs of different sizes.

The present invention has been described in detail with particular reference to a preferred embodiment thereof but it will be understood that variations and modifications can be effected within the spirit and scope of the present invention.

What is claimed is:

1. A battery pack charger for charging at least a small capacity battery pack and a large capacity battery pack, each of the small and large capacity battery packs containing a plurality of batteries, and having sides, a forward end section having a common thickness and a bottom surface, each of the sides including a first lug, and the bottom surface having a pair of charging terminals and a first recess, said battery pack charger comprising:

a casing on which each of said small and large capacity battery packs are slidably mounted, said casing having a pair of guides for guiding the sides of each of said small and large capacity battery packs, a mounting surface for mounting each of said large and small capacity battery packs, and a head for holding from above the forward end section of each of said large and small capacity battery packs when mounted, said pair of guides each having a second recess in which the first lug of each of said small and large capacity battery packs is fitted;

a printed-circuit board with a charging circuit supplying a charging current and formed on said printed-circuit board and installed within said casing;

a fixing member removably secured on said printed-circuit board, for fixing the forward end section of each of said small and large capacity battery packs cooperatively with said head of said casing, said fixing member having a second lug adapted for fitting in the first recess of each of said small and large capacity battery packs; and a pair of current supply terminals electrically connected to said charging circuit on said printed-circuit board, said pair of current supply terminals contacting said pair of charging terminals of each of said small and large capacity battery packs and adapted to supply the charging current to each of said small and large capacity battery packs from said charging circuit.

2. The battery pack charger as defined in claim 1, wherein said fixing member includes an upper surface, and wherein a pair of terminal holes are formed in the upper surface of said fixing member, and said pair of current supply terminals protrude upward from said pair of terminal holes.

3. The battery pack charger as defined in claim 1, wherein said casing comprises a front casing and a rear casing, which are fixedly joined with screws into one body.

* * * * *